United States Patent
Timsjo et al.

(10) Patent No.: US 9,575,488 B2
(45) Date of Patent: Feb. 21, 2017

(54) METHOD AND SYSTEM FOR MONITORING AN INDUSTRIAL SYSTEM INVOLVING AN EYE TRACKING SYSTEM

(71) Applicant: ABB Research Ltd., Zurich (CH)

(72) Inventors: Susanne Timsjo, Vasteras (SE); Martin Olausson, Vasteras (SE)

(73) Assignee: ABB Research Ltd., Zurich (CH)

( * ) Notice: Subject to any disclaimer, the term of this patent is extended or adjusted under 35 U.S.C. 154(b) by 706 days.

(21) Appl. No.: 13/920,865

(22) Filed: Jun. 18, 2013

(65) Prior Publication Data
US 2013/0282151 A1    Oct. 24, 2013

Related U.S. Application Data

(63) Continuation of application No. PCT/EP2010/070589, filed on Dec. 22, 2010.

(51) Int. Cl.
*G02B 27/00* (2006.01)
*G05B 23/02* (2006.01)
*G06F 3/01* (2006.01)

(52) U.S. Cl.
CPC ......... *G05B 23/027* (2013.01); *G02B 27/0093* (2013.01); *G05B 23/0272* (2013.01); *G06F 3/013* (2013.01); *G05B 2219/35427* (2013.01)

(58) Field of Classification Search
CPC ............ G02B 27/0093; G05B 23/0272; G05B 2219/35427; G05B 23/027; G06F 3/013
USPC ......... 700/80, 83, 108; 345/8, 158; 351/209, 351/210; 382/117
See application file for complete search history.

(56) References Cited

U.S. PATENT DOCUMENTS

| 4,543,567 A | * | 9/1985 | Shirata ............ G08B 23/00 340/506 |
| 6,152,563 A | | 11/2000 | Hutchinson et al. |
| 6,421,571 B1 | * | 7/2002 | Spriggs ............ G05B 15/02 345/629 |
| 7,396,129 B2 | | 7/2008 | Endrikhovski et al. |
| 7,762,665 B2 | | 7/2010 | Vertegaal et al. |

(Continued)

FOREIGN PATENT DOCUMENTS

| EP | 0816979 A1 | 1/1998 |
| EP | 1679577 A1 | 7/2006 |

(Continued)

OTHER PUBLICATIONS

International Preliminary Report on Patentability Application No. PCT/EP2010/070589 Completed: Feb. 22, 2013, 19 pages.

(Continued)

*Primary Examiner* — Robert Fennema
*Assistant Examiner* — Jennifer L Norton
(74) *Attorney, Agent, or Firm* — Whitmyer IP Group LLC

(57) ABSTRACT

A method for notifying at least a first condition in an industrial system by way of a monitoring system in order to draw the attention of an operator monitoring the industrial system to the at least one condition. The method includes displaying the first condition in a first portion of a display screen of the monitoring system, determining by eye tracking an area where a user focuses on the display screen, the area where the user focuses differing from the first portion, and alerting the user of the first condition in order to allow the user to be notified of the first condition in the industrial system. A monitoring system is also presented herein.

16 Claims, 4 Drawing Sheets

(56) References Cited

U.S. PATENT DOCUMENTS

| | | | |
|---|---|---|---|
| 2002/0147511 A1* | 10/2002 | Eryurek | G05B 23/027 700/80 |
| 2005/0007249 A1* | 1/2005 | Eryurek | G05B 23/027 340/511 |
| 2005/0047629 A1 | 3/2005 | Farrell et al. | |
| 2006/0007396 A1 | 1/2006 | Clement et al. | |
| 2009/0030556 A1* | 1/2009 | Castelli | G06Q 10/063 700/286 |
| 2010/0102136 A1* | 4/2010 | Hadzidedic | F24F 11/0079 236/49.3 |
| 2011/0006978 A1* | 1/2011 | Yuan | G06F 3/013 345/156 |
| 2011/0144777 A1* | 6/2011 | Firkins | G05B 23/027 700/80 |

FOREIGN PATENT DOCUMENTS

| | | | | |
|---|---|---|---|---|
| SE | WO 2010122032 A1 * | 10/2010 | | G05B 23/0272 |
| WO | 2006009972 A1 | 1/2006 | | |
| WO | 2010118292 A1 | 10/2010 | | |

OTHER PUBLICATIONS

International Search Report and Written Opinion of the International Searching Authority Application No. PCT/EP2010/070589 Completed: Nov. 10, 2011; Mailing Date: Nov. 17, 2011, 10 pages.
Written Opinion of the International Preliminary Examining Authority Application No. PCT/EP2010/070589 Mailing Date: Nov. 21, 2012, 5 pages.

\* cited by examiner

METHOD AND SYSTEM FOR MONITORING AN INDUSTRIAL SYSTEM INVOLVING AN EYE TRACKING SYSTEM

FIELD OF THE INVENTION

The invention generally relates to a method for monitoring an industrial system and to a monitoring system for implementing the method.

BACKGROUND OF THE INVENTION

System operators of industrial systems are faced with a large amount of information on the operator screens displaying the status of the industrial system or industrial process. In power systems for instance, an operator may have to monitor a local distribution network comprising a plurality of substations, transformer stations, power lines, and other power equipment forming the distribution network.

A problem with the current way of displaying data on operator screens, which includes utilizing different colors for different status of an equipment in the industrial system, is that the operator always will be presented with data relating to the complete industrial system or process. Hence, it may happen that due to the large amount of information present, the operator will not notice a condition in the industrial system when the condition occurs.

US2006/007396 discloses a method and system for automated monitoring of a display. Gaze tracking is utilized with a display to monitor attention to information on the display. Additionally, a level of alarm is escalated for the updated information when the attention by the system operator is not detected within a predetermined time period.

WO2006/009972 discloses a system and method are provided for managing data being displayed on at least one monitor screen based on monitoring user's attention in relation to the monitor screen. In one embodiment, upon detecting that the user's attention is leaving at least a portion of a screen, the system may alert the user of such an event. Alternatively, the system could alert the user upon detecting a triggering condition while the user's attention is away from the at least a portion of the screen. The step of alerting the user may include modifying at least a portion of a display on a monitor not being viewed by the user. Additionally, the system may initiate preparation of a report including any data not being viewed by a user during the time period when the user is not viewing a portion of the monitor.

EP0826979 discloses that user messages are automatically positioned on a display at a location at which a user's gaze is directed as indicated by an eyetracker. When a user has read the message, as indicated by his eyes having traversed the text, the message is automatically cleared. The message may also be cleared by a user's spoken response.

SUMMARY OF THE INVENTION

It is desirable that the attention of the operator or user is drawn to a portion of the operator screen that displays a condition, such as an alert or abnormal behavior in the industrial system. Thereby the condition could be handled more efficiently shortly after the condition has occurred.

A general object of the present invention is to provide a method and system for determining whether an operator or a user monitoring an industrial system has noticed that a condition occurs in the industrial system.

A condition is to be construed as a fault, abnormal or unusual behavior in the industrial system.

An industrial system is to be understood to be any kind of industrial system, such as a power plant, an automated process in a factory, a local electrical distribution network, or a larger part of an electrical grid.

The inventors of the present invention have realized that eye-tracking may be utilized for facilitating the monitoring of industrial systems via a monitoring system having a display screen such as an operator screen. To this end, eye movement of an operator is analyzed by an eye-tracking unit when the operator monitors the display screen in order to determine which area of the display screen the operator focuses on. In case a condition arises in the industrial system and it is determined that the operator is focusing on a part of the display screen which does not present the condition, the monitoring system will draw the user's attention to the portion presenting the condition by means of an alert.

Hence, in a first aspect of the present invention there is provided a method for notifying at least a first condition in an industrial system by means of a monitoring system, the method comprising: displaying the first condition in a first portion of a display screen of the monitoring system; determining by means of eye tracking an area where a user focuses on the display screen, the area where the user focuses differing from the first portion; and alerting the user of the first condition in order to allow the user to be notified of the first condition in the industrial system.

As a result, the probability is increased that the operator or user monitoring the industrial system will detect the condition.

In one embodiment the alerting may comprise magnifying at least one object displayed in the first portion of the display screen. Thereby the user's attention will be drawn to the condition while additional details of the condition may be presented due to the magnified view.

One embodiment may comprise verifying that the user has been notified of the first condition by detecting a user action; and returning to a normal viewing mode of the display screen. Hence, verification that the user has noticed the condition can be provided to the monitoring system in which the method is implemented.

The alerting may comprise setting off an audible alarm. Alternatively, or additionally, the alerting may comprise setting off a visual alarm on the display screen.

One embodiment may comprise displaying a second condition of the industrial system in a second portion of the display screen, the second portion differing from the area where the user focuses; and magnifying at least one object displayed in the second portion of the display screen.

The magnified at least one object in the first and the second portions may be displayed on the display screen simultaneously.

An effect which may be obtainable thereby is that several conditions may be displayed simultaneously on the display screen. Beneficially, the attention of the user may be drawn to several simultaneous conditions in the industrial system.

One embodiment may comprise determining a weight parameter for each of the first and the second condition, wherein the step of magnifying is first performed for those objects which are associated with that condition of the first and second condition which has a weight parameter corresponding to a more severe condition in the industrial system. Hence, the most severe condition may be presented first to a user.

Alternatively, any other condition than the most severe condition will not be displayed or magnified until an action to handle the most severe condition has been taken by the user.

The magnifying may comprise magnifying the at least one object so that it covers substantially the entire display screen. Thereby details concerning the condition may be presented to the user which may be beneficial because the display screen generally comprises a multitude of information relating to the industrial system and the specifics about a condition may be difficult to make out if information pertaining to the condition is not magnified.

The step of magnifying may in one embodiment occur only when the first portion and the area where the user focuses differs.

One embodiment may comprise receiving data from the industrial system, the data comprising information of the first condition of the industrial system. Thus, input signals can be received from the industrial system so as to allow the graphical representation of the industrial system to be updated based on status data from the industrial system.

According to a second aspect of the present invention there is provided a monitoring system for monitoring an industrial system, the monitoring system comprising: an input unit arranged to receive data from the industrial system, the data comprising information of a first condition of the industrial system; a display device having a display screen arranged to display the first condition of the industrial system in a first portion of the display screen; an eye-tracking unit arranged to determine an area where a user of the monitoring system focuses on the display screen; a processor arranged to provide an alert to the monitoring system so as to notify the user of the first condition when the area where the user focuses differs from the first portion of the display screen.

The processor may be arranged to magnify objects in the first portion of the display screen to thereby provide the alert.

The first and the second aspects of the present invention generally present the same or similar advantages, as would be apparent to the skilled person.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

Figure 1:
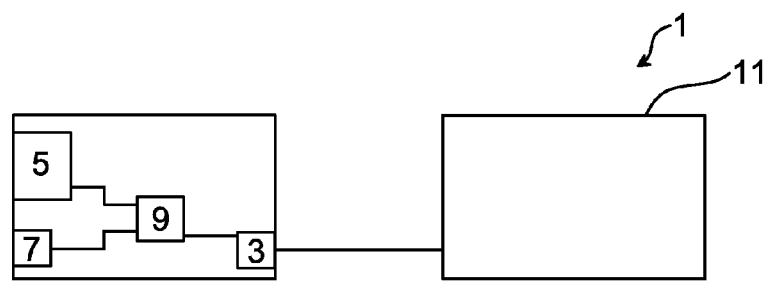
FIG. 1 shows a schematic block diagram of a monitoring system according to an embodiment of the present invention.

FIG. 1 is a block diagram of an embodiment of a monitoring system 1 according to one embodiment of the present invention. The monitoring system 1 comprises an input unit 3, a display device 5, an eye-tracking unit 7, and a processor 9. The input unit 3 may receive data from an industrial system 11. The data received by the input unit 3 may for instance relate to the status of the industrial system 11. The input unit 3 may typically be a data interface which is adapted to be connected to the industrial system 11.

The industrial system 11 may for instance be a power plant, an automated process in a factory, a local electrical distribution network, or a larger part of an electrical grid.

The data received from the industrial system 11 by the input unit 3 may comprise information regarding the status of equipment in the industrial system. If for instance the industrial system is a local distribution grid, the status of the power lines, of substation equipment such as transformers and relays may be received by the input unit 3.

In one embodiment, the input unit 3 is connected to the processor 9. The data received by the input unit 3 may thereby be provided to the processor 9.

The industrial system 11 may be represented graphically on a display screen 5-1 (shown in e.g. FIG. 2a) of the display device 5. The display device 5 may be an existing type of computer screen, such as an operator screen. It is also envisaged that the display screen may be of a type that can present graphics in a three-dimensional stereoscopic view.

The display device 5 may typically be able to receive information from the processor 9. Thereby the status of equipment in the industrial system 11, which is represented by objects on the display screen 5-1, may be updated and presented substantially in real-time on the display screen.

The eye-tracking unit 7 may be connected to the processor 9 to provide the processor 9 with information pertaining to an area of the display screen where a user focuses his or her eyes. The eye-tracking unit 7 may utilize any known methods, such as for instance infrared light, to determine the direction in which an eye is focusing, e.g. the direction in which the pupils focus. Eye-tracking technology will not be elucidated further herein, as the basic operation of eye-tracking technology is generally known.

Figure 2A:
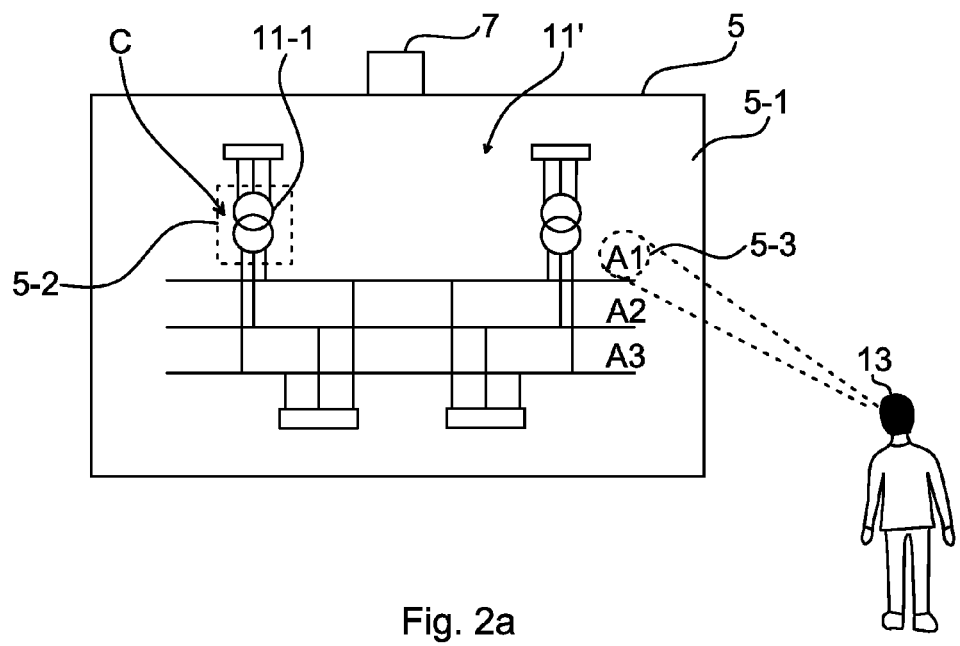
FIGS. 2a-b shows a first example of operation of one embodiment of the present invention.
Figure 2B:
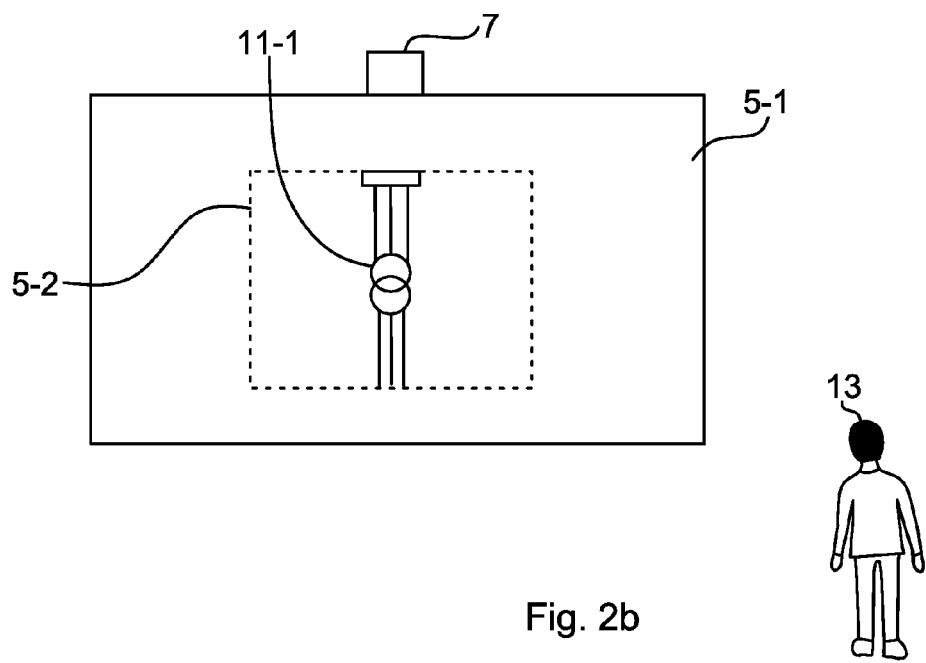

With reference to FIGS. 2a-b, an example of operation of one embodiment of the present invention is shown.

FIG. 2a shows the display screen 5-1 of the display device 5. Display screen 5-1 displays a representation of part of a power system 11', which here exemplifies the industrial system 11. The power system 11' comprises power lines A1, A2 and A3, and substations and transformers, such as transformer 11-1.

The eye-tracking unit 7 detects the direction in which the user 13 focuses his eyes. In the present example the user focuses his eyes in an area 5-3.

A condition C such as a fault condition occurs at the transformer 11-1. The input unit 3 receives data detailing the status of the transformer 11-1. If the eye-tracking unit 7 has determined that the user does not focus in a first portion 5-2 of the display screen 5-1, in which first portion 5-2 the transformer 11-1 is located, after a predetermined amount of time, the processor 9 will magnify objects, such as the transformer 11-1, in the first portion 5-2. The magnified first portion 5-2 is shown in FIG. 2b.

Thus, the display device 5 may be switched between two modes; a normal viewing mode, and an alert mode in which that portion of the display screen 5-1 which contains a condition to be brought to the attention of the user 13 is magnified.

It should however be understood that the alert may be in other forms than magnification of objects displayed in the first portion. For instance, the alert may be provided in the form of an audible alarm. Alternatively, the alert may be provided as a visual alarm or as an audiovisual alarm. A visual alarm may for instance be a text string displayed on the display screen or a visual effect being presented on the display screen.

In one embodiment, the user 13 will have to provide a user input or user action to the monitoring system 1 for the display screen 5-1 to enter the normal viewing mode when the display screen 5-1 present the alert mode. Such user action may be any indication providing verification that the user has indeed been notified of the condition C. For instance, such user action may be the user 13 pushing a button pressing a key on a keyboard connected to the monitoring system 1. Alternatively, or additionally, a user action may be when a user focuses a longer than a predetermined threshold value on the first portion of the display screen which displays the condition. The eye-tracking unit and the processor may determine that the user's eyes have been focusing long enough on that part of the display screen which presents the condition, resulting in verification that the condition has been notified to the user. As a result the display screen may be set into normal viewing mode.

Figure 3A:
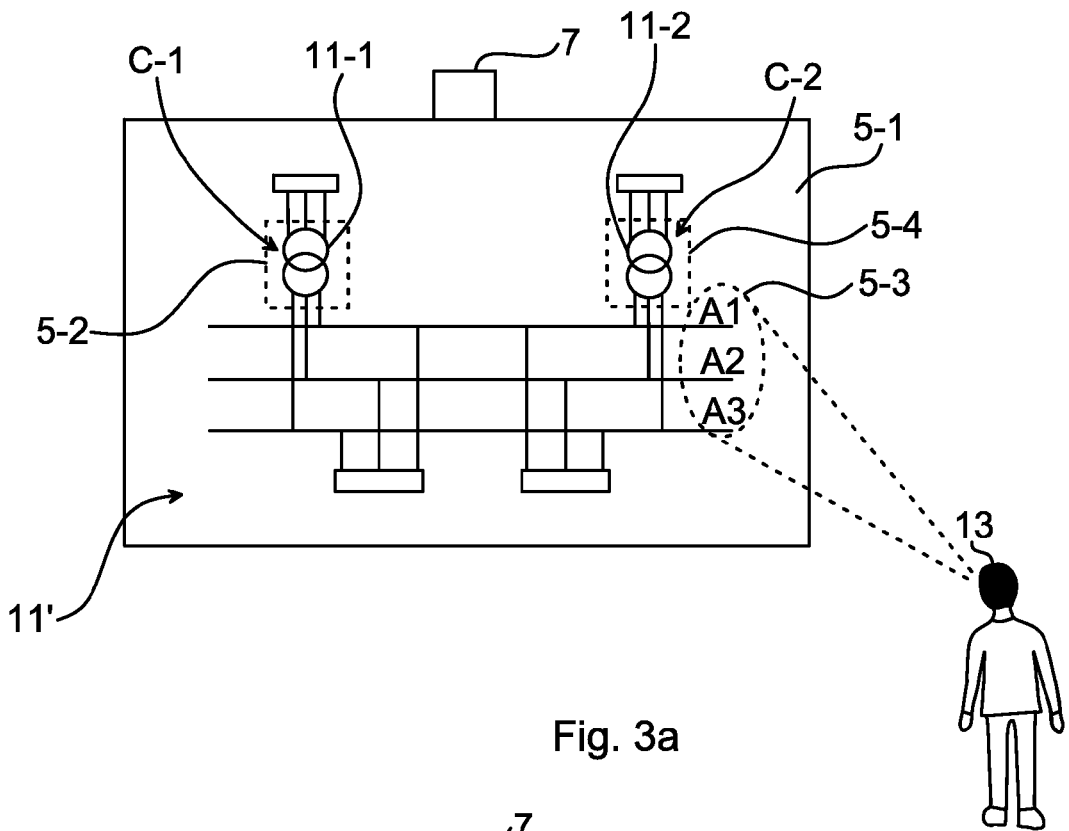
FIGS. 3a-b shows a second example of operation of one embodiment of the present invention.
Figure 3B:
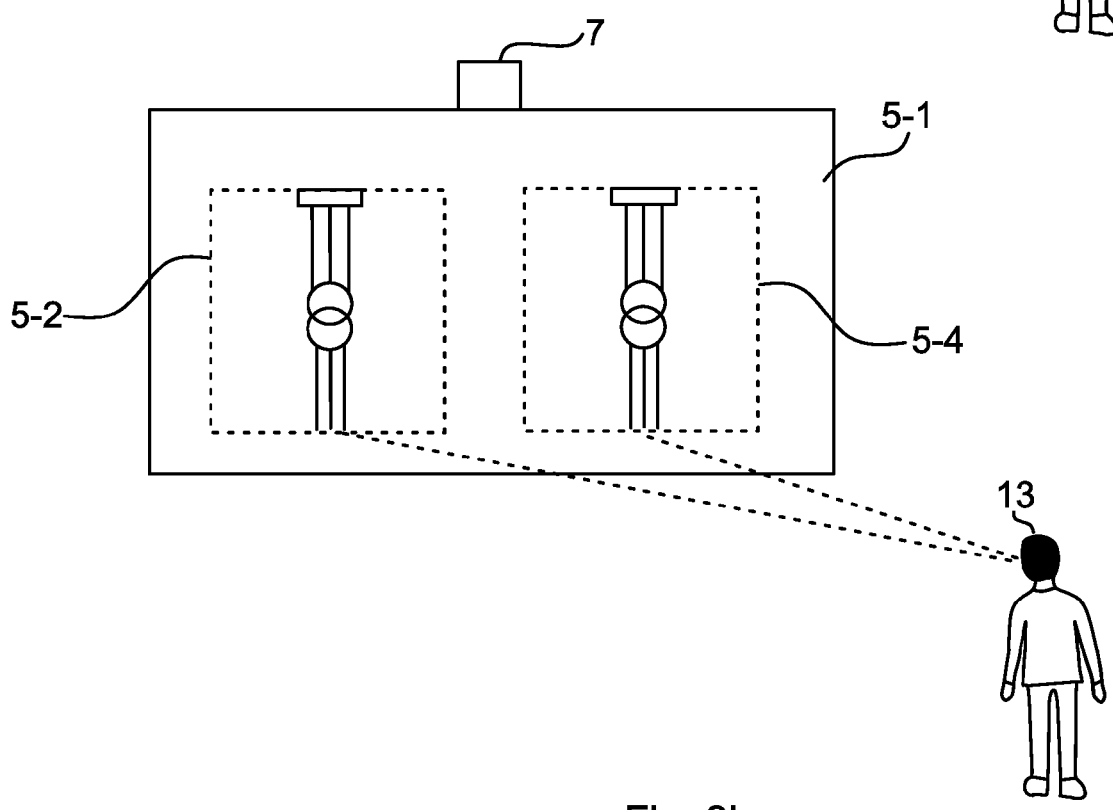

With reference to FIGS. 3*a-b*, another example of operation of the present invention is shown.

In a similar manner as already shown in FIG. 2*a*, a graphical representation 11' of the industrial system 11 is presented on the display screen 5-1 of the display device 5. A first condition C-1 and a second condition C-2 in transformers 11-1 and 11-2, respectively, have been detected and are presented on the display screen 5-1. The first condition C-1 is present in the first portion 5-2 of the display screen 5-1. The second condition C-2 is present in a second portion 5-4 of the display screen 5-1.

The eye-tracking unit 7 detects that the eyes of the user 13 focuses in the area 5-3. The area 5-3 is different than the first portion 5-2 and the second portion 5-4. Therefore, in order to draw the attention of the user to the first and the second conditions C-1 and C-2, objects in the first portion 5-2 and the second portion 5-4 are magnified, as shown in FIG. 3*b*. Such objects may for instance be parts or portions of the transformers 11-1 and 11-2, or the objects may be the entire transformers 11-1 and 11-2. The objects can also be the transformers 11-1 and 11-2 and additional components related to the conditions displayed in the first and/or second portion 5-2, 5-4. The same variations may also apply to the example of FIGS. 2*a-b*.

In one embodiment, weight parameters W-1 and W-2 are associated with the first condition C-1 and the second condition C-2, respectively. The weight parameters W-1 and W-2 may provide a measure of the severity or importance of the first and second conditions C-1 and C-2. Generally, the severity or importance of a plurality of conditions may be determined by means of a unique weight parameter associated with each condition.

The weight parameters W-1 and W-2 may, when having been determined, be compared with each other. The determining may be performed e.g. by the processor 9. The comparing may be performed by the processor 9. In some embodiments, the determining may have been conducted external to the monitoring system 1, already when the data is received by the input unit 3.

In one embodiment, the condition which is determined to be most important by means of the weight parameters is magnified first so as to allow the user to focus on solving the most important or severe condition.

In one variation of the present invention, a plurality of conditions may be displayed and magnified on the display screen in a similar manner as described in the example above.

It should be noted that an alert other than magnification may also be possible when several conditions are present simultaneously, as already elaborated with reference to FIGS. 2*a-b* above in the case of one condition being present in the industrial system.

The methods described herein will now be described in more detail herebelow, with reference to FIGS. 4*a-b*.

Figure 4A:
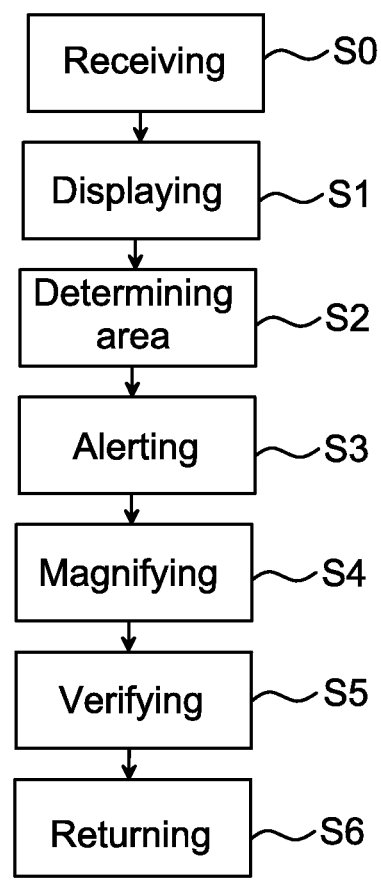
FIGS. 4a-b show flowcharts of a method for notification of a condition in an industrial system on a display screen.

FIG. 4*a* shows a flowchart of methods for notification of a condition in an industrial system 11 on the display screen 5-1. Examples of these methods have been presented hereabove.

In a step S0, data from the industrial system 11 is received by the input unit 3. The data typically comprises status information of equipment in the industrial system 11. Such status information may indicate that one or more condition is present in the industrial system 11.

In a step S1, if a condition is present in the industrial system 11, the condition is displayed on the display screen 5-1. The condition may be displayed in a first portion of the display screen 5-1, the first portion corresponding to a part of the graphical representation of the industrial system 11 which represents the equipment being subject to the condition in the industrial system 11.

In a step S2, it is determined, by means of eye-tracking, where a user focuses on the display screen 5-1.

If the area where a user focuses on the display screen 5-1 differs from the first portion, i.e. the portion that shows the condition, the user is notified of the condition in a step S3 of alerting.

In one embodiment, the step of alerting S3 comprises magnifying at least one object in the first portion in a step S4 of magnifying. The step of magnifying S4 may include magnifying the at least one object so that it covers substantially the entire display screen 5-1.

Magnifying may in some embodiments involve presenting a different view of the at least one object compared to the view of the at least one object when not magnified, i.e. when the display screen is in the normal viewing mode.

In some embodiments the step of alerting S3 may comprise providing e.g. an audible alarm or a visual alert, such as providing a flicker effect on the display screen 5-1. Alternatively an audiovisual alarm may be set off. Thereby a user who has not paid attention to the display screen should become aware of the condition in the industrial system.

In a step S5 it is verified that the user has been notified of the condition based on a detection of a user action performed by the user. When it has been verified that the user has noticed the condition, the display screen returns from the alert mode to the normal viewing mode in a step S6.

Figure 4B:
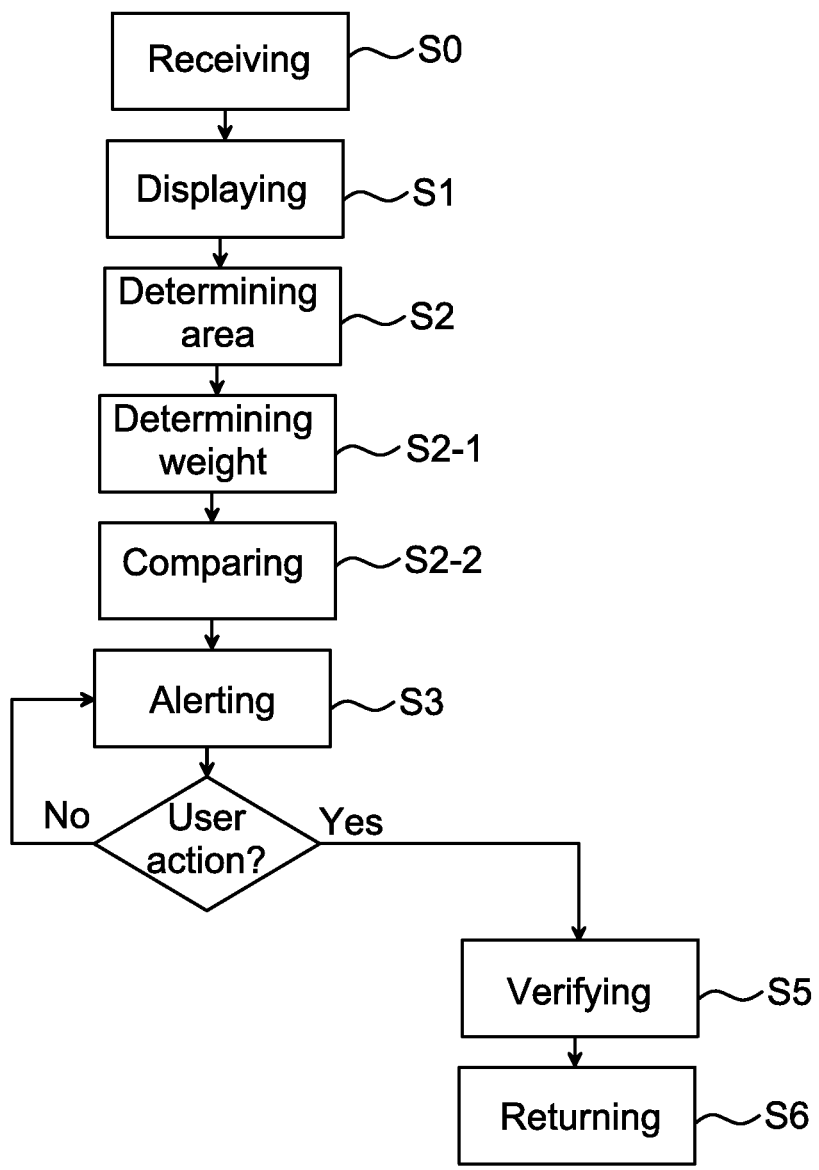

In some variations of the present invention, a step S2-1 of determining weight parameters of the conditions in the industrial system 11 is performed, as shown in FIG. 4*b*. The weight parameters may serve as indicators of the importance or severity of the conditions involved.

In a step S2-2 the determined weight parameters may be compared so as to determine which of the conditions is the most important to draw to the attention of the user.

The skilled person in the art realizes that the present invention by no means is limited to the embodiments described above. On the contrary, many modifications and variations are possible within the scope of the appended claims. For instance, the portion of the display screen which presents the condition may be magnified when a user focuses on the condition, wherein the same portion of the display screen will not be magnified if the condition is not present in that portion of the display screen even though the user focuses thereon.

What is claimed is:

1. A method for notifying at least a first condition and a second condition in an industrial system, the first condition being abnormal behavior in the industrial system, by means of a monitoring system, the method comprising:
displaying the first condition in a first portion of a display screen of the monitoring system,
determining by means of eye-tracking an area where a user focuses on the display screen,
if the area where the user focuses differs from the first portion, alerting the user of the first condition in order to allow the user to be notified of the first condition in the industrial system, the alerting comprises magnifying at least one object displayed in the first portion of the display screen,
displaying the second condition of the industrial system in a second portion of the display screen, the second portion differing from the area where the user focuses, magnifying at least one object displayed in the second portion of the display screen, and
determining a weight parameter for each of the first and the second condition, wherein the step of magnifying is first performed for those objects which are associated with that condition of the first or second condition which has a weight parameter corresponding to a most severe condition in the industrial system.

2. The method as claimed in claim 1, comprising:
verifying that the user has been notified of the first condition by detecting a user action, and returning to a normal viewing mode of the display screen.

3. The method as claimed in claim 1, wherein the alerting comprises setting off an audible alarm.

4. The method as claimed in claim 1, wherein the alerting comprises setting off a visual alarm on the display screen.

5. The method as claimed in claim 1, wherein the magnified at least one object in the first and the second portions are displayed on the display screen simultaneously.

6. The method as claimed in claim 1, wherein the magnifying comprises magnifying the at least one object so that it covers substantially the entire display screen.

7. The method as claimed in claim 1, wherein the step of alerting only occurs when the first portion and the area where the user focuses differs.

8. The method as claimed in claim 1, comprising receiving data from the industrial system, the data comprising information of the first condition of the industrial system.

9. A computer program product comprising a non-transitory computer readable medium on which computer executable code is stored, which computer executable code when executed performs a method for notifying at least a first condition and a second condition in an industrial system, the first condition being abnormal behavior in the industrial system, by means of a monitoring system, the method comprising:
displaying the first condition in a first portion of a display screen of the monitoring system,
determining by means of eye-tracking an area where a user focuses on the display screen,
if the area where the user focuses differs from the first portion, alerting the user of the first condition in order to allow the user to be notified of the first condition in the industrial system, the alerting comprises magnifying at least one object displayed in the first portion of the display screen,
displaying the second condition of the industrial system in a second portion of the display screen, the second portion differing from the area where the user focuses,
magnifying at least one object displayed in the second portion of the display screen, and
determining a weight parameter for each of the first and the second condition, wherein the step of magnifying is first performed for those objects which are associated with that condition of the first or second condition which has a weight parameter corresponding to a most severe condition in the industrial system.

10. A monitoring system for monitoring an industrial system, the monitoring system comprising:
an input unit arranged to receive data from the industrial system, the data comprising information of a first condition of the industrial system, the first condition being abnormal behavior of the industrial system,
a display device having a display screen arranged to display the first condition of the industrial system in a first portion of the display screen,
an eye-tracking unit arranged to determine an area where a user of the monitoring system focuses on the display screen,
a processor arranged to provide an alert to the monitoring system so as to notify the user of the first condition when the area where the user focuses differs from the first portion of the display screen, the processor is arranged to magnify objects in the first portion of the display screen to thereby provide the alert,
the input unit is further arranged to receive data from the industrial system comprising information of a second condition of the industrial system,
the display device is further configured to display the second condition of the industrial system in a second portion of the display screen,
the processor is further arranged to magnify objects in the second portion of the display screen when the area where the user focuses differs from the second portion,
the processor is arranged to determine a weight parameter for each of the first and the second condition and to magnify those objects which are associated with that condition of the first or second condition which has a weight parameter corresponding to a most severe condition in the industrial system first.

11. The method as claimed in claim 1, wherein
the at least one object graphically represents a status of a piece of equipment of the industrial system on the display screen, and
the status is updated substantially in real-time.

12. The method as claimed in claim 1, wherein
the industrial control system includes a power system,
statuses of power lines, substations, and transformers of the power system are represented graphically on the display screen,
the statuses are updated substantially in real-time,
the at least one object represents one of the power lines, substations, and transformers, and
the magnifying includes magnifying the at least one object so that it covers substantially the entire display screen.

13. The method as claimed in claim 1, wherein the magnifying comprises presenting a different view of the at least object so that it covers substantially the entire display screen.

14. The method as claimed in claim 2, wherein the user action comprises entering input into a keyboard.

15. The method as claimed in claim 1, wherein the step of magnifying any objects which are associated with any other condition than the most severe condition is not carried out until an action to handle the most severe condition has been taken by the user.

16. The monitoring system according to claim 10, wherein the processor is arranged to not carry out the magnification of any objects which are associated with any other condition than the most severe condition until an action to handle the most severe condition has been taken by the user.

* * * * *